(12) United States Patent
Bhatnagar (10) Patent No.: US 9,412,283 B2
(45) Date of Patent: Aug. 9, 2016

(54) SYSTEM, DESIGN AND PROCESS FOR EASY TO USE CREDENTIALS MANAGEMENT FOR ONLINE ACCOUNTS USING OUT-OF-BAND AUTHENTICATION

(71) Applicant: Piyush Bhatnagar, Morganville, NJ (US)

(72) Inventor: Piyush Bhatnagar, Morganville, NJ (US)

( * ) Notice: Subject to any disclaimer, the term of this patent is extended or adjusted under 35 U.S.C. 154(b) by 78 days.

(21) Appl. No.: 14/143,659

(22) Filed: Dec. 30, 2013

(65) Prior Publication Data

US 2014/0223175 A1 Aug. 7, 2014

Related U.S. Application Data

(60) Provisional application No. 61/747,517, filed on Dec. 31, 2012.

(51) Int. Cl.
*H04L 29/06* (2006.01)
*G09C 5/00* (2006.01)
*H04L 9/32* (2006.01)

(52) U.S. Cl.
CPC .............. *G09C 5/00* (2013.01); *H04L 9/3228* (2013.01); *H04L 63/0853* (2013.01); *H04L 63/18* (2013.01); *H04L 2209/80* (2013.01)

(58) Field of Classification Search
CPC ....... G06F 21/313; H04L 63/06; H04L 63/08; H04L 63/18
See application file for complete search history.

(56) References Cited

U.S. PATENT DOCUMENTS

| | | | | |
|---|---|---|---|---|
| 8,256,664 | B1* | 9/2012 | Balfanz et al. | 235/375 |
| 9,027,099 | B1* | 5/2015 | Saylor | G06F 21/36 705/64 |
| 2011/0219427 | A1* | 9/2011 | Hito | G06F 21/00 726/3 |
| 2013/0145446 | A1* | 6/2013 | Dorso | G06F 21/43 726/6 |
| 2013/0167208 | A1* | 6/2013 | Shi | 726/5 |
| 2013/0173915 | A1* | 7/2013 | Haulund | 713/159 |
| 2014/0026204 | A1* | 1/2014 | Buntinx | 726/9 |
| 2014/0096220 | A1* | 4/2014 | Da Cruz Pinto et al. | 726/9 |

* cited by examiner

*Primary Examiner* — Izunna Okeke
*Assistant Examiner* — Hee Song
(74) *Attorney, Agent, or Firm* — Douglas C. Wyatt (57) ABSTRACT

The invention provides an easy to use credential management mechanism for multi-factor out-of-band multi-channel authentication process to protect a large number of documents without the need to remember all the document passwords. When opened, the secure document application generates a multi-dimensional code. The user scans the multi-dimensional code and validates the secure document application and triggers an out-of-band outbound mechanism. The portable mobile device invokes the authentication server to get authenticated. The authentication server authenticates the user based on shared secret key and is automatically allowed access to the secure document. The process of the invention includes an authentication server, a secure document application to generate an authentication vehicle or an embodiment (i.e. multi-dimensional bar code) and handle incoming requests, secret keys and a portable communication device with a smartphone application.

5 Claims, 6 Drawing Sheets

SYSTEM, DESIGN AND PROCESS FOR EASY TO USE CREDENTIALS MANAGEMENT FOR ONLINE ACCOUNTS USING OUT-OF-BAND AUTHENTICATION

PRIORITY

This application claims priority U.S. Provisional Application Ser. No. 61/747,517 dated Dec. 31, 2012 the entire contents of which are all relied upon and fully incorporated herein by reference.

INCORPORATION BY REFERENCE

Applicant incorporates by reference herein United States publication No. 2012-0240204-A1, entitled "System, Design and Process for Strong Authentication using Bidirectional OTP and Out-of-Band Multichannel Authentication."

FIELD OF THE INVENTION

The field of invention relates to network and Internet security. The present invention relates to an authentication system and authentication method and in particular to a process and design for a multi-factor, out-of-band multi-channel authentication process to protect all online accounts without involving the account provider.

BACKGROUND OF THE INVENTION

Authentication of a user and their credentials is the first line of defense. User authentication involves confirming the identity of a user and validating that a user is trusted and can use a computer resource based on their credentials. Most people protect their online accounts using some form of passwords. On an average a typical user has about 20 accounts for which they need to remember passwords. Most users utilize the same password for most accounts just to make it easier to remember. This practice makes all accounts vulnerable and makes it easier for a hacker to break into all other accounts if one of the accounts is compromised.

ID's can be lost or stolen during transactions (whether its login, payment, or other transactions), ID's must be presented in many places explicitly. For example, in the process of electronic payment, ones credit card details must be presented to a counter party. Although ID in a transaction may be encrypted, there are still many possibilities that ID can be lost or stolen.

Static or fixed password is a common form of authentication method in use today.

In the static password authentication method, the user enters static user id and password on a client site and submits. Then the request is sent to the authentication server to validate the credentials of the user. If the credentials are valid the user is traversed to the next page.

With static password, keeping the accounts secure and hack proof is a difficult task. To keep their accounts from being compromised, the user must select long, difficult to predict passwords. Most users use some of their personal information to create their password thus making it easier to remember. In addition, users have a tendency to use the same password for most of their accounts as remembering multiple passwords can be quite a challenge.

Different random generators or OTP platforms use the in band authentication mechanism this leads to hacker being in the same environment as the authentication mechanism.

Multi factor authentication exists and is prevalently used in enterprises, as these techniques are more secure. Using multi factor authentication for anything other than enterprise environment is still a huge adoption and usability challenge. A common user today accesses number of sites and has multiple online accounts. A user today will access one or more private emails servers, access his/her online banks, make purchases using various online stores and check personalized news. For each of these activities, the user will have to login to their service providers to access these services. None of these services use multi factor authentication today and depend on static passwords. The primary reason is due to the complexity of deployment and cumbersome usage of Multi Factor authentication today.

An object of the present invention is to address the problem of the related art technique and to provide an authentication system and authentication method which permit improvement in the security of the authentication system while making it easier to use. The invention, utilizes bi-directional multi-channel authentication. One embodiment is based on multi-dimensional QR Code which provides a vehicle for strong authentication, ease of use, minimal switching cost and lower total cost of ownership. By utilizing the multi-dimension bar code solution improves usability and eliminates key security issues.

SUMMARY OF THE INVENTION

The instant invention provides an easy to use authentication and credential management mechanism for multi-factor out-of-band multi channel authentication process to protect all online accounts without involving the account provider. This invention provides a strong multi-factor authentication and transaction mechanism for end users/consumers to protect their user identities and accounts and provide seamless usability. This system gives access to authentication seekers based on an out of band authentication mechanism. The authentication seeker or system user scans the multi-dimensional barcode or via other embodiments and validates the client and triggers the out of band outbound mechanism. The portable mobile device invokes the client server to get authenticated. The client server authenticates the user based on shared secret key and is automatically traversed to the next page. This invention protects the users from Key logger, Dictionary attacks, Man-in-the Browser (MITB), Replay attacks, and Phishing attacks. The process of the invention includes an: authentication server, a browser extension to generate an authentication vehicle or an embodiment (i.e. multi-dimensional barcode) and handle incoming requests, secret keys and a portable communication device with a smartphone app.

A preferred embodiment of the present invention utilizes a client/server system, which comprises an authentication server, a browser extension or plug-in, and a user hand held mobile device equipped with a camera or reader and an online authentication client, all of which are connected via a network. The browser extension and the authentication server achieve mutual secure connection based on secure sockets layer (SSL). The handheld device is also connected to the network and can connect to the authentication server in a secure manner using SSL.

In an embodiment, a user who wants to login to an online account (like Gmail, or Yahoo) using this invention opens a login portal on the online server using a browser with a custom browser extension or plug-in. The browser extension detects that the login portal requires user credentials and shows an icon on the browser toolbar. The user clicks on the icon and the browser extension or plug-in generates a multi-dimensional dynamic barcode based on online service client/server information (including but not limited to the IP-address of the client machine and the URL of the destination login portal), a dynamically generated key and a unique session ID and presents it to the user on the login page, either as an alternative or as a replacement of a login/password. The browser extension at that point contacts the authentication server and informs it that it is waiting for user credentials for this specific login port with a specified session ID. The user starts the authentication client application on the hand-held device that includes the authentication client application and camera. The user provides its authentication information, such as a PIN or Gesture and/or additional biometric signature like face match, voice print match, etc. The handheld device then establishes an independent secure connection over carrier network wireless connection or Wi-Fi connection to the authentication server using SSL. The hand-held device validates the user PIN/Gesture as well as the biometric profile with the authentication server. The online authentication client on the hand held device decrypts/decodes the barcode and ensures the validity of the browser extension. This unique client validation mechanism ensures there are no phishing attacks. Once the validity of the secure document application is ensured, the online authentication client takes the extracted data from the bar code, looks up in a secure credentials database for the login portal by extracting information from the login portal URL. If the credentials for that secured document are not found in the secure credentials database, the hand held device authentication client presents a screen to the user to provide the credentials for that login portal. Once the user provides the credentials, the authentication client saves the credentials on the secure credentials database on the hand held device for future use. The authentication client on the hand held device then sends user credentials for the login portal along with the unique session ID to the authentication server directly using this secure out-of-band channel. If the authentication server finds the user and the session ID valid, it contacts the waiting browser extension using the session ID and passes the user credentials as well as user roles/privileges. Based on the user roles/privileges the online service server can automatically provide specified access to the allowed service components that the user has been authorized for.

In this embodiment, the user experience is simplified and can only require the user scanning the barcode presented on the login screen. From users' perspective, once the scanning barcode is done, if user is valid, the login proceeds to the next screen based on the user rights.

It is to be understood that both the foregoing description and the following description are exemplary and explanatory only and are not restrictive of the invention, as claimed. Specific examples are included in the following description for purposes of clarity, but various details can be changed within the scope of the present invention.

BRIEF DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE INVENTION

Figure 1:
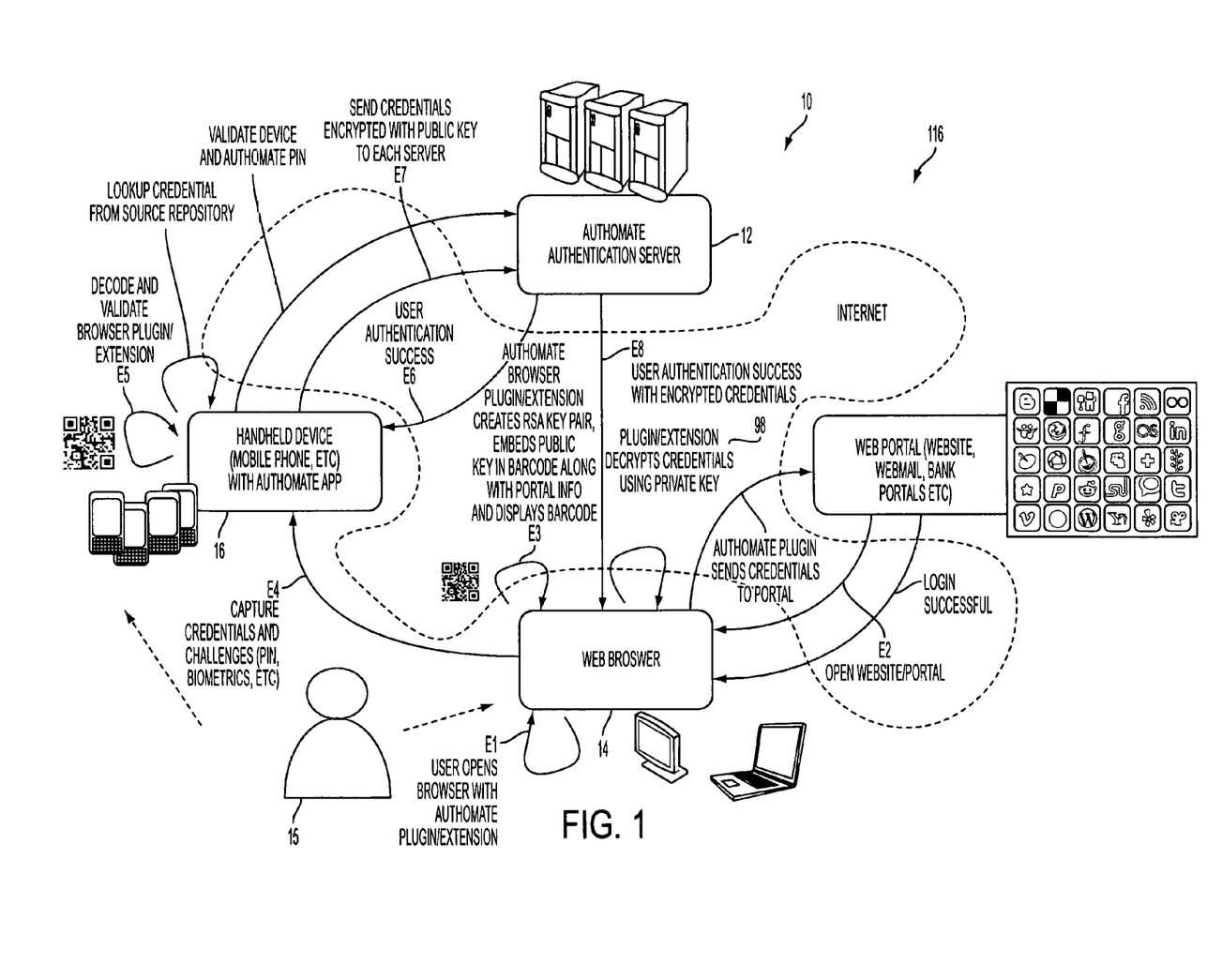
FIG. 1 is a block diagram describing the various components of an embodiment invention and depicting an example of an out-of-band outbound multi-channel authentication.

Referring to the drawing, FIG. 1 illustrates a preferred embodiment of system and process according to the invention. In particular, FIG. 1 shows an authentication system 10 that utilizes out-of-band outbound multi-channel authentication using a client/server system comprising an authentication server 12, browser having client processing 14, such as plug-ins or extensions, and a user hand held mobile device 16 equipped with a camera and with online authentication client, all of which are connected via a communications network 116 to access an online account server.

The browser plug-in and the authentication server achieve mutual secure connection based on SSL. The handheld device is also connected to the network and can connect to the authentication server in a secure manner using SSL.

Figure 6:
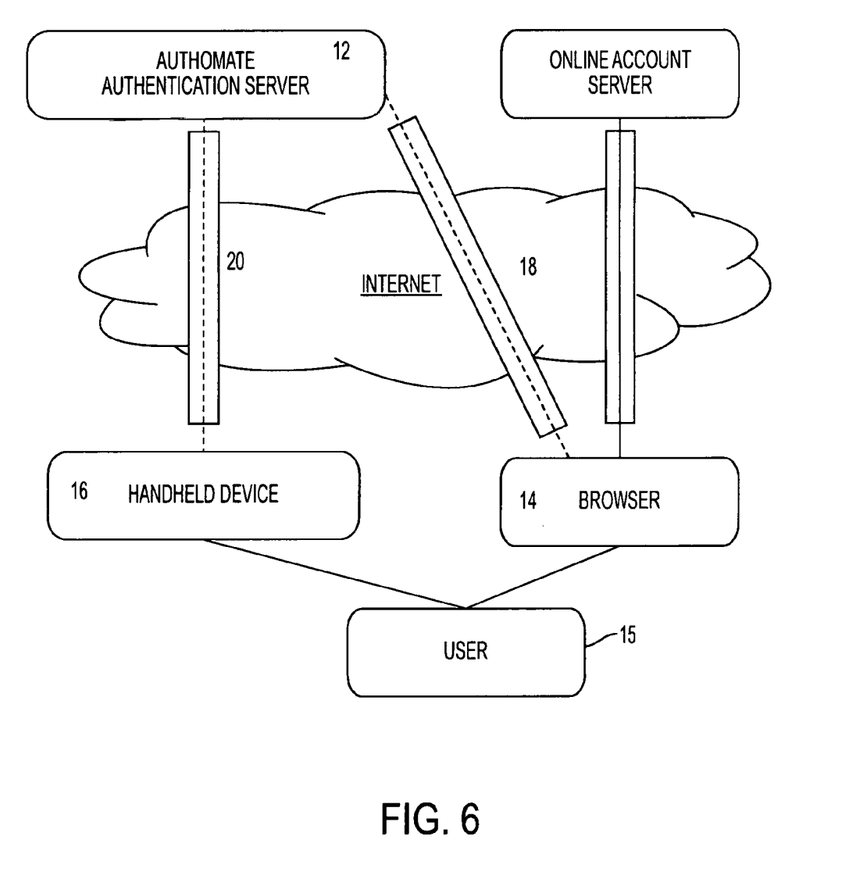
FIG. 6 is a block diagram illustrating one example of two separate communication channels in an embodiment of the present invention.

FIG. 6 illustrates one example of the two separate communication channels in present invention that are used for authentication process. The handheld device 16 communicates with the authentication server 12 over a first communications channel 18 which is separate from a second communications channel 20 over which the browser having the client processing application 14 and authentication server 12 communicate. In one embodiment of a system and process according to the invention, at least the out-bound portions of communications from the handheld device to the authentication server are provided in a separate communications channel 18 and are out-of-band from the communication channel 20 over which the authentication server 12 and client processing application 14 communicate.

The authentication server 12 compares the user information and the third party server credentials to a database of user information and a database of third party server credentials. The authentication server 12 authenticates the user information and the third party server credentials to obtain authentication results. The authentication server 12 transmits E1 the authentication results to the client processing application 14 and can also transmit E2 the authentication results to the portable communications device 16. The client processing application 14 also transmits E3 the authentication results to the hand held device 16. If the authentication results are positive, a secure communication may be established between the user and the client processing application 14, and the user 15 may be granted access by the client processing application 14. Alternatively, if the authentication results are negative, the user is denied further access to the client processing application 14.

Figure 2:
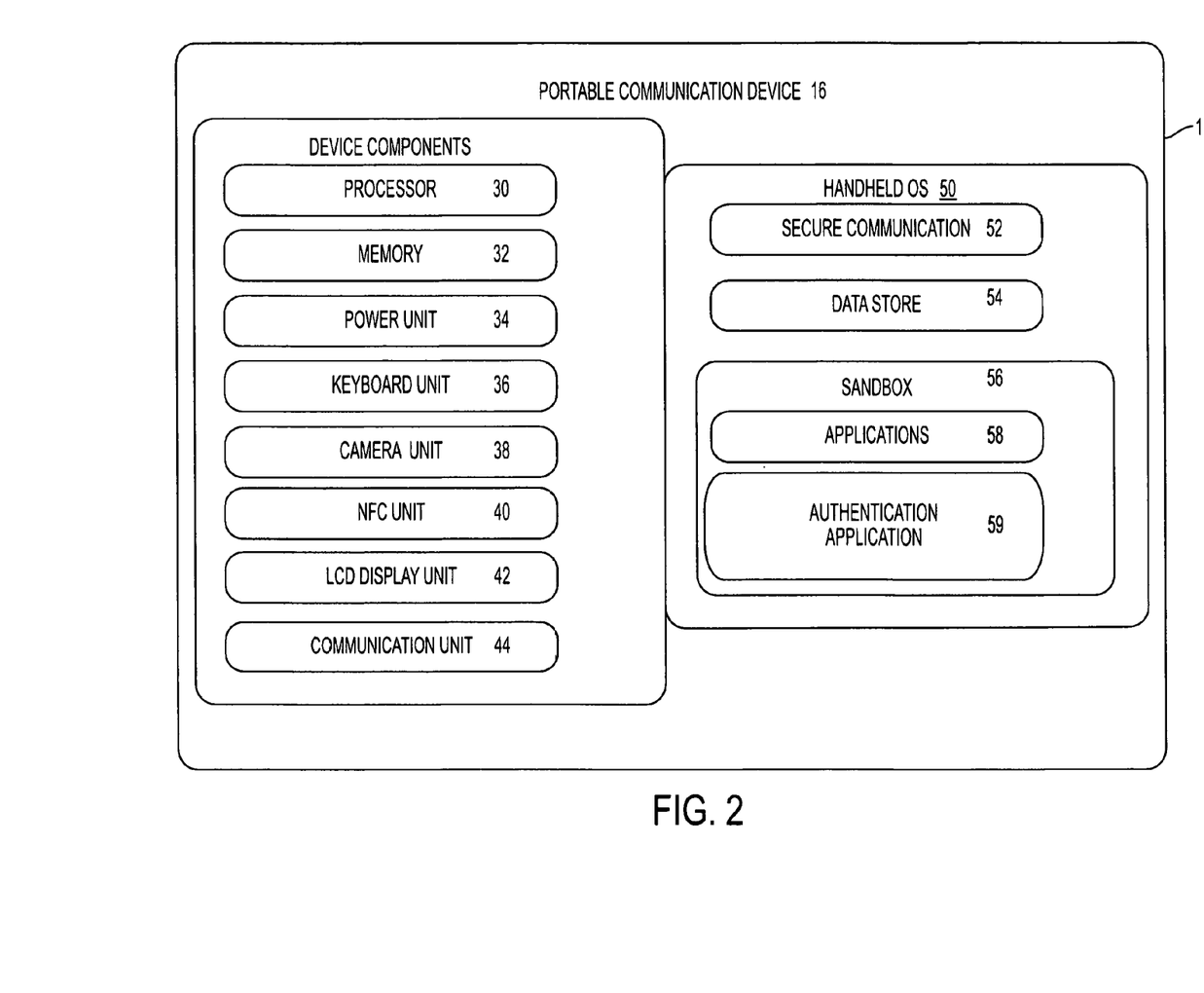
FIG. 2 is a schematic block diagram of an embodiment of a handheld portable communication device.

FIG. 2 illustrates the components of an embodiment of a portable communication device 16 according to the invention, such as a handheld device like a mobile phone or an iPad. The portable communications device can include various components, including a processor 30, memory 32, power unit 34, keyboard 36, camera 38, a near field communication ("NFC") unit 40, LCD Display 42 and a communications unit 44. The device also has an operating system 50 which includes programming for the processes utilized by the device, including programming for secure communication 52, a data storage 54 as well as a sandbox 56, containing an authentication application 58 and other supplemental applications 59 to supplement the processes of the authentication application 58. The sandbox provides a security mechanism for separating running programs and thereby enhances the security of a device according to the invention. Incorporation of an NFC unit 40 in a device according to the invention facilitates use of a device according to the invention by a user in a manner which can make the underlying processes appear seamless. It can be appreciated by a person of ordinary skill in the art to use known processes for the device including processes for providing secure communication 50 by the device 16 to provide for secure receipt and transmission of information. Other applications 59 include software (and there may be hardware capabilities/applications/libraries on the phone) that provide capabilities like picture taking and touch sensitive activity detection.

Figure 3:
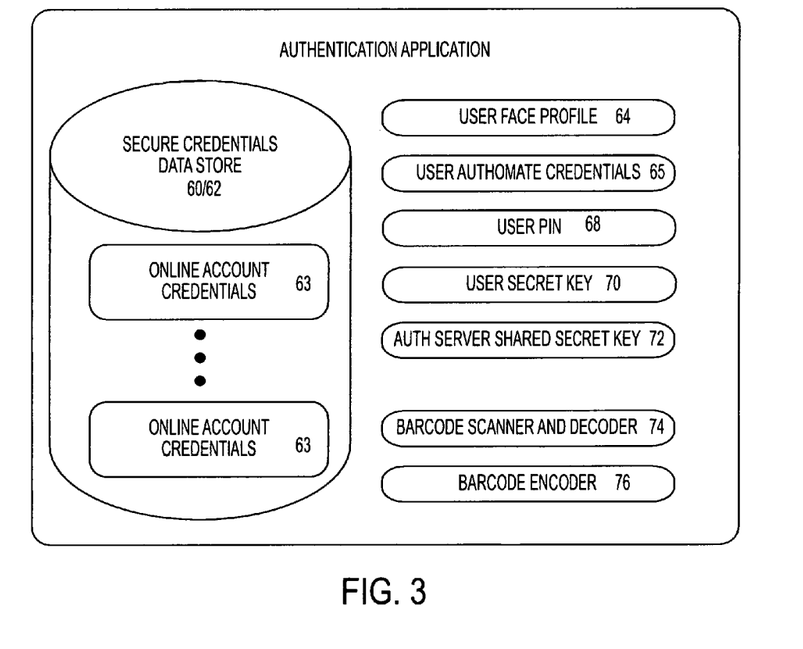
FIG. 3 is a schematic block diagram of embodiment of an authentication application that may reside in the handheld portable communication device described in FIG. 2.

FIG. 3 illustrates an embodiment of an authentication application having processes that may reside in the handheld portable communication device described in FIG. 2. It can be appreciated by a person of ordinary skill in the art that various programming can be provided to effect the processes of a device 16 according to the invention. The processes can be programmed into one or more separately discrete units. Among other things, a secure data storage 60 process can be provided to effect secure storage and retrieval of information from memory 32 on the device 16. Among other things, the secure data storage 62 and credentials 63 can include one or more shared secret keys associated with one or more client processing applications 14. In addition, a user face profile 64 can be provided for a face profile for use with the processes performed by device 16. The authentication application 58, 59 can also include separate processes for managing and storing other information, such as user credentials 66, a user pin 68, user secret key 70, and an authentication server shared secret key 72 which can be stored in the secure data storage 62 or in other portions of the memory 62. Furthermore, the device 16 includes processes for a barcode scanner and decoder 74 and a barcode encoder 76, which processes can be provided separately or as part of the authentication application 58 process software. The components and arrangements of FIGS. 2 and 3 may be varied within the principles of the present application.

Figure 4:
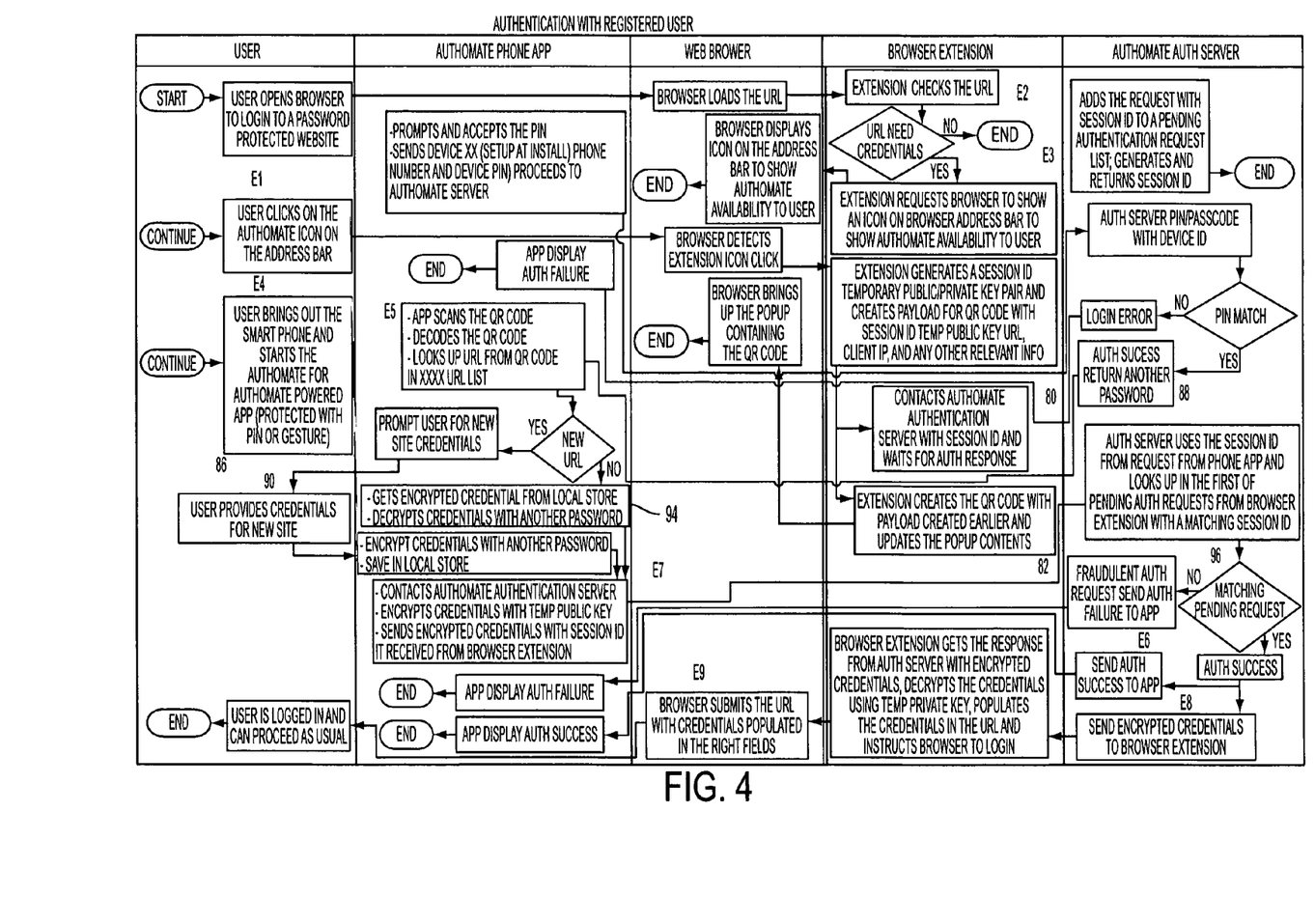
FIG. 4 is a sequence diagram describing the authentication flow based on an embodiment of a method and/or process based on the invention.

Referring to FIGS. 1 and 4, client user starts E1 a client processing application 14 with laptop or PC, which can be automatically started once a user desires to login to an associated online account or portal. For example, the user can open a browser to log in to a password-protected website. Thereafter, the browser can load the URL.

The client processing 14 checks the URL E2 to determine whether or not the associated website requires credentials. The client processing 14 can do this by checking a secure database. If the website requires credentials, the client processing extension can request the browser to show an icon on the browser address bar to show availability of the instant invention to provide secure connection and the needed credentials. In this embodiment, the browser displays the icon, and if the user clicks on the icon the browser detects the extension icon selection to proceed and the browser extension and/or client processing 14 generates a session ID, a temporary public/private key pair and creates a payload for a QR Code with the session ID, temporary public key URL, client IP, and any other relevant information. Thereafter the browser client processing 14 contacts E2 the authorization server 12 to start a new authorization session and the server generates a session ID 80 sent E3 to the client processing application. The client processing application 14 creates 82 a multi-dimensional barcode with dynamic encryption keys, server portal information, session and a unique key and displays the barcode in a popup. The client processing application waits for notification.

Further, or in the alternative, the client extension processing 14 can create the QR code with the payload created earlier and updates the pop-up contents. Thereafter the browser can bring up a pop-up containing a QR code for the user to scan.

In addition to or in the alternative, the client processing application 14 and/or browser extension contacts the authentication server with the session ID, and the authentication server can add the session ID to a list of pending authentication requests.

In addition, or as an alternate, the client processing application 14 creates an RSA key and embeds public key in bar code along with portal information, and displays barcode on laptop or PC screen.

User starts authentication 86 by using a smart phone and starting the handheld authentication application 59, or automate power application and entering E4 PIN or gesture on handheld device 16 to access the application. The alternate phone application prompts and accepts the PIN and then sends the device ID (which can be set up upon initialization of services), phone number and device ID/passcode to the authentication server 12.

Authentication server 12 receives the PIN/passcode with the device ID and checks against a secure database for a match for the device to login to the authentication server. If the match is successful, the authentication server returns notification and/or a password to the handheld device application 59 indicating success, and accordingly completes a process which validates PIN and can alternatively, or in addition display one or more scan options 88.

User holds 90 handheld device to laptop or PC login screen and clicks scan option E5. Device scans barcode and validates the client processing application 92. On notification E6, the handheld device 16 finds 94 the encrypted user credentials with encryption key from barcode and sends E7 the encrypted credentials and session ID to authentication server 12. Authentication server 12 checks 96 in provisioned user database, validates session, and sends E8 encrypted payload to waiting client processing application 14. The client processing application decrypts 98 payload using the keys it generated and extracts the credentials. The client processing application 14 then uses the decrypted credentials to provide access to login to the online account and/or web portal and proceed to use those services of the online account.

Handheld device 16 displays result received E9 from the authentication server.

The out-of-band outbound mechanism provides an additional level of security due to the original request being different than the outgoing push from the portable device to the service provider server.

The usability issue is addressed by utilizing the scanning functionality of the hand held device. This eliminates erroneous typing and user frustration.

Figure 5:
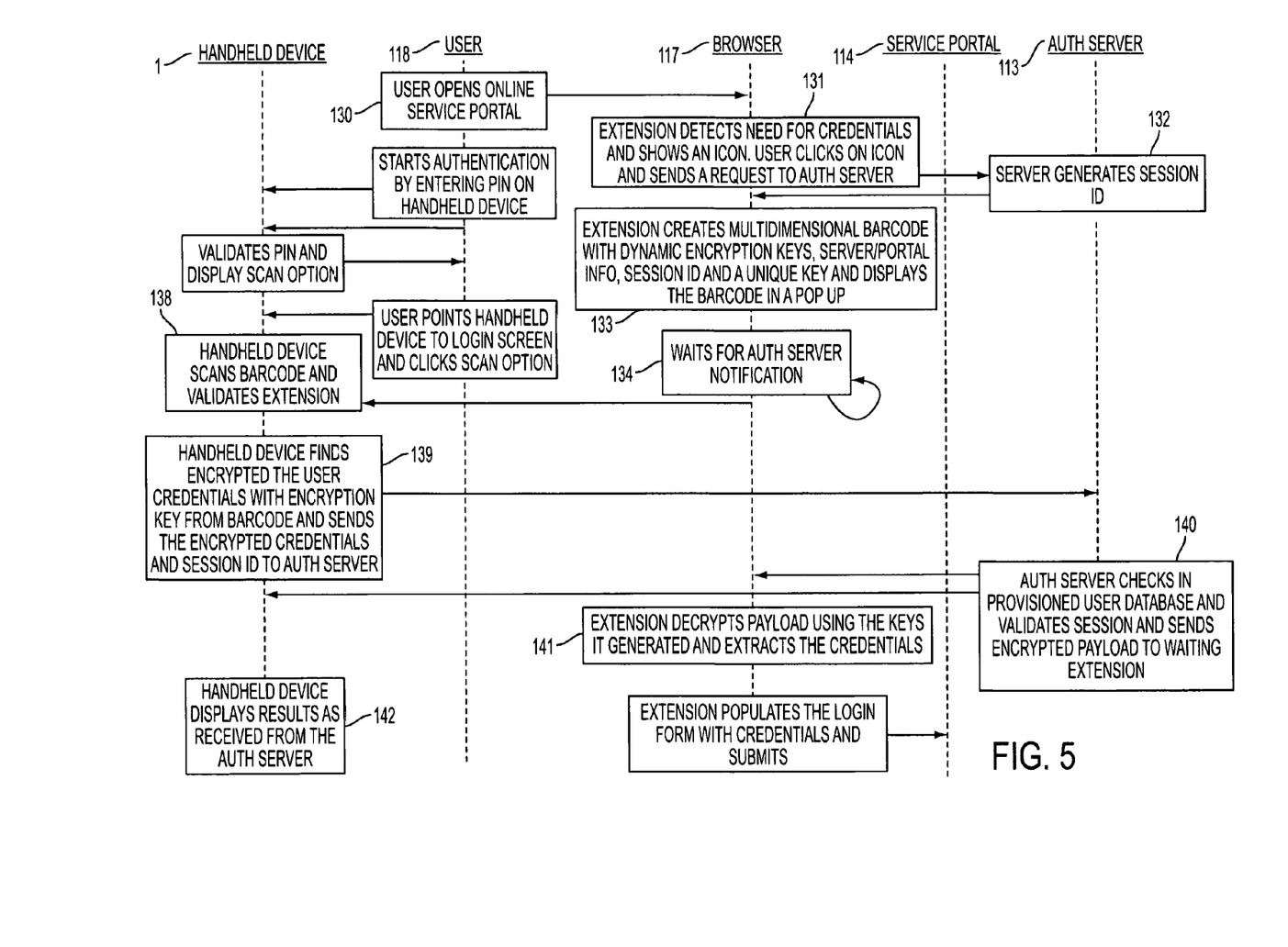
FIG. 5 is a sequence diagram describing the authentication flow based on an embodiment of a method and/or process based on the invention.

FIG. 5 shows a high level, less detailed and alternative embodiment of a method according to the invention shown in FIG. 4. A further embodiment, includes one or more variation of the methods and steps described above, and can include one or more of the following.

A method for authentication typically resides in a system comprising a user, a browser extension or plugin, a portable communications device, and an authentication server having provisioned user database and encrypted payload.

The method can begin by detecting user intent to login to an online portal (like, gmail, yahoo, ebay, etc) using a browser, and then establishing contact between browser extension or plugin and authentication server wherein a new authentication session is started.

Thereafter, a session ID can be generated at the authentication server, wherein the session ID is communicated to the browser plugin through at least a first communications channel.

A multi-dimensional barcode can be created at the browser extension or plugin, wherein the barcode has dynamic encryption keys, portal information, session ID, and a unique key, and wherein the barcode is displayed in the browser.

In one embodiment, the browser can be held in a waiting state pending authentication server notification of session validation, whereupon once positive notification is received starting authentication by user entering credential on portable communications device, wherein portable communications device validates credential and displays one or more scan options.

In one embodiment, a portable communications device can be used to scan barcode displayed at login screen and validate browser extension or plugin. However other techniques of coded transmission including but not limited to NFC, RFID and Bluetooth, can be used within the scope of the invention.

Once the encrypted user credentials are located on the portable communications device with encryption key from barcode (or an alternative technique of transmission).

The encrypted credentials are sent with the session ID from portable communications device to authentication server via a outbound out-of-band communications channel.

Then, a matching of information is checked in the provisioned user database of authentication server, and the session is validated. Once validated, The encrypted payload is sent to waiting the browser extension or plugin, and validation result can be sent from the authentication server to the portable communication device where the result can be displayed.

The payload can be decrypted at the browser extension or plugin using encryption keys; and credentials can be extracted and decrypted at the browser extension as well.

Using decrypted credentials the login form on the login page of the online portal in the browser can be populated or transmitted directly to initiate and/or complete the login requirements of the online portal, such as by sending the login form to the online portal using the browser extension or plugin.

Similarly, as shown in FIGS. 4, 5 and 6 a method according to the invention can include a number of steps. One possible variation of a method according to the invention is set forth as follows. A user 118 interacts 130 with a client processing application 117.

The client processing application 117 contacts 131 and authorization server 113 to start a new session. The authorization server 113 starts a new session and generates 132 a session ID.

The authorization server 113 communicates with the secure client processing 117 and provides information, including among other things session ID information.

The client processing application 117 creates 133 a multi dimensional barcode with barcode information, including dynamic encryption keys, server/portal information, session ID and a unique key. The client processing application can display the generated barcode.

The client processing application and then waits 134 for receipt of a notification from the authorization server to proceed.

The barcode that has been generated by the client processing application 117 is displayed by the application. The user 118 can scan the barcode with the handheld device 1. The handheld device scans the barcode and validates 138 the service server.

The handheld device finds 139 encrypted the user credentials with encryption key from the barcode and sends validation information including the encrypted credentials and the session ID to the authentication server.

The authorization server receives the validation information, including the encrypted credentials and the session ID and checks 140 the provisioned user database and validates and sends encrypted payload to the waiting client processing application as notification.

The client processing application 117 decrypts 141 the payload from the authorization server using the keys it generated and extracts the credentials. The client processing application then uses the decrypted credentials to provide access to the login portal of the online account or service.

Accordingly, the handheld device can also display and/or access 142 the online account or service. In addition, the handheld device then displays 142 the results which it receives from the authorization server.

Various changes may be made to the system and process embodying the principles of the invention. The foregoing embodiments are set forth in an illustrative and not in a limiting sense. The scope of the invention is defined by the claims appended hereto.

I claim:

1. A method for authentication for accessing an online portal in a system comprising a user, a client processing application, a portable communications device, and an authentication server having a provisioned user database and encrypted payload, wherein the method comprises:
    providing a login portal and screen for access by a user, said login portal being in communication with said client processing application;
    establishing contact between the client processing application and the authentication server wherein a new authentication session is started;
    generating a session identifier at the authentication server, wherein the session identifier is communicated to the client processing application through at least a first communications channel;
    creating a multi-dimensional barcode at the client processing application, wherein the barcode has dynamic encryption keys, portal information, session identifier, and a unique key, and wherein the barcode is displayed at the login screen;
    holding the client processing application in waiting pending the authentication server notification of session validation;
    starting authentication by user entering credential on the portable communications device, wherein the portable communications device validates credential and displays scan option;
    using the portable communications device to scan the barcode displayed at the login screen and validate the client processing application;
    finding on the portable communications device at least one encrypted user credentials with the encryption key from the barcode;

sending the encrypted credentials and session identifier from the portable communications device to the authentication server via a outbound out-of-band communications channel;

checking in provisioned user database of the authentication server, wherein the session is validated;

sending the encrypted payload to the waiting client processing application;

sending validation result from the authentication server to the portable communication device where the result is displayed;

decrypting the encrypted payload at the client processing application using the encryption keys;

extracting and decrypting the credentials at the client processing application;

using the decrypted credentials to access the online portal.

2. A method according to claim 1 wherein the login portal is provided at the client processing application for receiving information for the user.

3. A method according to claim 1 wherein the login portal and the client processing application for receiving information for the user are contained in a laptop.

4. A method according to claim 1 wherein the login portal and the client processing application for receiving information for the user are contained in a personal computer.

5. A method for authentication in a system comprising a user, a browser extension or plugin, a portable communications device, and an authentication server having a provisioned user database and a encrypted payload, wherein the method comprises:

detecting user intent to login to an online portal using a browser extension or plugin;

establishing contact between the browser extension or plugin and the authentication server wherein a new authentication session is started;

generating a session identifier at the authentication server, wherein the session identifier is communicated to the browser plugin through at least a first communications channel;

creating a multi-dimensional barcode at the browser extension or plugin, wherein the barcode has dynamic encryption keys, portal information, the session identifier, and a unique key, and wherein the barcode is displayed in the browser;

holding the browser in waiting pending authentication server notification of session validation;

starting authentication by user entering credential on the portable communications device, wherein the portable communications device validates the credential and displays scan option;

using the portable communications device to scan the barcode displayed at a login screen and validate the browser extension or plugin;

finding on the portable communications device at least one encrypted user credential with the encryption key from the barcode;

sending the at least one encrypted credential and the session identifier from the portable communications device to the authentication server via a outbound out-of-band communications channel;

checking in provisioned user database of the authentication server, wherein the session is validated;

sending the encrypted payload to the waiting browser extension or plugin;

sending validation result from the authentication server to the portable communication device where the result is displayed;

decrypting the payload at the browser extension or plugin using the encryption keys;

extracting and decrypting the at least one encrypted credential at the browser extension or plugin to obtain at least one decrypted credential;

using the at least one decrypted credential to populate a login form on the login page of the online portal in the browser;

initiating the login to the online portal by sending the login form to the online portal using the browser extension or plugin.

* * * * *